United States Patent
Kim et al.

(10) Patent No.: US 8,611,318 B2
(45) Date of Patent: Dec. 17, 2013

(54) METHOD AND SYSTEM FOR CONNECTING MOBILE COMMUNICATION TERMINAL WITH ACCESS POINT

(75) Inventors: Du-Seok Kim, Yongin-si (KR); Dong-Yun Shin, Seosan-si (KR); Giu-Yeol Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 697 days.

(21) Appl. No.: 12/725,052

(22) Filed: Mar. 16, 2010

(65) Prior Publication Data

US 2010/0232409 A1    Sep. 16, 2010

(30) Foreign Application Priority Data

Mar. 16, 2009   (KR) ................ 10-2009-0022378

(51) Int. Cl.
*H04W 4/00*   (2009.01)
(52) U.S. Cl.
USPC ........................................................ 370/338
(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/395.53, 412–421, 431–457, 458–463, 370/464–497, 498–529
See application file for complete search history.

(56) References Cited

U.S. PATENT DOCUMENTS

| | | | |
|---|---|---|---|
| 7,263,076 B1* | 8/2007 | Leibovitz et al. | 370/310 |
| 8,064,418 B2* | 11/2011 | Maki | 370/338 |
| 2004/0213260 A1* | 10/2004 | Leung et al. | 370/395.3 |
| 2005/0102529 A1* | 5/2005 | Buddhikot et al. | 713/200 |
| 2006/0153117 A1* | 7/2006 | Bichot et al. | 370/316 |
| 2007/0186273 A1* | 8/2007 | Carpy et al. | 726/2 |
| 2010/0124193 A1 | 5/2010 | Prakash et al. | |

FOREIGN PATENT DOCUMENTS

| | | |
|---|---|---|
| KR | 1020030053280 | 6/2003 |
| KR | 1020060102181 | 9/2006 |
| KR | 1020080024436 | 3/2008 |
| KR | 1020080054420 | 6/2008 |

* cited by examiner

*Primary Examiner* — Jung-Jen Llu
(74) *Attorney, Agent, or Firm* — The Farrell Law Firm, P.C.

(57) ABSTRACT

Disclosed is a method for connecting a mobile communication terminal with an access point located in a local area providing a Wireless Local Area Network (WLAN) service in which a server managing the access point compares Media Access Control (MAC) information of the mobile communication terminal or MAC information of the access point transferred from the mobile communication terminal through a mobile communication network with MAC information previously stored in the server and transfers network setting information required for connection to the access point to the mobile communication terminal if the MAC information of the mobile communication terminal or access point is identical to the MAC information previously stored in the server.

10 Claims, 14 Drawing Sheets

METHOD AND SYSTEM FOR CONNECTING MOBILE COMMUNICATION TERMINAL WITH ACCESS POINT

PRIORITY

This application claims priority under 35 U.S.C. §119(a) to a Korean Patent Application entitled "Method And System for Connecting Mobile Communication Terminal with Access Point" filed in the Korean Industrial Property Office on Mar. 16, 2009 and assigned Serial No. 10-2009-0022378, the contents of which are incorporated herein by reference.

BACKGROUND OF THE INVENTION

1. Field of the Invention

The present invention relates generally to the Wireless Local Area Network (WLAN), and more particularly to a method and system for connecting a terminal with an access point in a WLAN.

2. Description of the Related Art

The WLAN is a system which converts transmission data between personal computers or servers into signals such as a radio wave signal or an optical signal, and wirelessly transmits/receives the converted signal. That is, the WLAN uses the air as a communication channel using radio waves or infrared rays without using a cable in establishing a network system, so as to be applied to a region requiring terminal mobility or improved cable wiring. Therefore, the WLAN is advantageous because it requires no cable wiring, establishes a flexible and mobile network within a short period of time, permits free installation and use of a terminal, and establishes a temporal network for exhibitioner the expansion of the existing network.

Recent portable terminals, such as a mobile phone, a notebook, and a Portable Multimedia Player (PMP), include a function of providing the WLAN in addition to the function of the conventional terminal and enables for a user to use Internet service while moving in and outside of a specific region. Further, as the use and dependence on Internet service rapidly increases, the use of the mobile communication terminal including the WLAN function has proliferated.

In this respect, a system capable of providing the WLAN service is established in the terminal including the WLAN function so that an area providing the WLAN service, i.e. the local area, has increased. Such a local area can be established, for example, in an exhibition place, building, public institution, or personal business place such as a shop, to provide the user with various services.

For example, when ordering or waiting for food in a shop, such as a coffee shop, a customer can enjoy the Internet service with connecting to an Internet network through an Access Point (hereinafter AP) within the shop. Further, the local area can provide the service capable of processing the retrieval of information on food served in the shop, the ordering, and the payment by using a terminal connected to the AP within the shop.

The WLAN system includes at least one AP for connecting the terminal supporting the WLAN with the WLAN by wire. The AP allocates a connectable Internet Protocol (IP) to the terminal desiring the connection to allow the terminal to use the wireless internet service through the AP. The AP allows the connection for every neighboring terminal according to the setting, or sets an authentication number, such as a network or a Wired Equivalent Privacy (WEP) for preventing security and use problems. It also only permits a connection for the user or terminal that knows the authentication number. Such a setting can be implemented through an administrator managing the AP.

However, if the network key or WEP key is registered in the AP and it is set to allow a specific user who knows the key value to connect to the AP, it is inconvenient for a casual user of the terminal. This is because the key value of the network key or WEP key registered in the AP must be inputted in the network setting in the terminal during the connection procedure between the terminal and AP for a successful connection between the terminal and the corresponding AP. If the administrator for the specific local area provides the terminal in which the network key or WEP key for the specific AP has been previously set, the terminal is valid only in the specific AP area, an increase in cost is incurred, and the mobility of the terminal cannot be guaranteed.

In this respect, the conventional AP is set to unconditionally allow the connection for every WLAN terminal within a wireless radio wave range. However, an unqualified user, such as a user having no connection authority, may connect the terminal to the AP of the specific local area without permission, thereby using the wireless Internet which deteriorates the quality of the service and renders provision of the service unselective.

SUMMARY OF THE INVENTION

Accordingly, the present invention has been made to solve the above-stated problems occurring in the prior art, and an object of the present invention is to provide a method and a system for selectively providing the WLAN service in a local area according to a user.

Another object of the present invention is to provide a method and a system for selectively providing the WLAN service according to a user and also improving the connection convenience between the terminal and the AP.

Another object of the present invention is to provide a method and a system for automatically connecting a terminal with an AP of a specific workplace using a telephone number of the workplace when the WLAN service is provided in the specific workplace.

Another object of the present invention is to provide a method and a system for connecting the terminal to the AP of the workplace and then automatically accessing a web page of the workplace, to provide the terminal with various services provided in the web page.

In accordance with the present invention, there is provided a method for connecting a mobile communication terminal with an access point located in a local area providing a WLAN service, the method including broadcasting, by the mobile communication terminal, a Media Access Control (MAC) information message including MAC information of the mobile communication terminal and transferring the MAC information message to a server through the access point, transmitting a WLAN access request message including the MAC information of the mobile communication terminal to the server through a mobile communication network, receiving a WLAN access response message including an authentication result obtained by the server using the MAC information included in each of the MAC information message and the WLAN access request message from the server, and extracting network setting information for connection to the access point from the WLAN access response message if the WLAN access response message is a message allowing the connection to the access point and connecting to the access point using the extracted network setting information.

In accordance with the present invention, there is provided a method for connecting a mobile communication terminal with an access point located in a local area providing a WLAN service, the method including receiving, by the mobile communication terminal, a guide message including MAC information of the access point from the access point, transmitting a WLAN access request message including the MAC information of the access point to a server through a mobile communication network, the server being connected with the access point and storing MAC information of the access point, receiving a WLAN access response message including an authentication result obtained by the server using the MAC information of the access point included in the WLAN access request message from the server, and if the WLAN access response message is a message allowing connection to the access point, extracting network setting information for the connection to the access point from the WLAN access response message and connecting to the access point using the extracted network setting information.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1A:
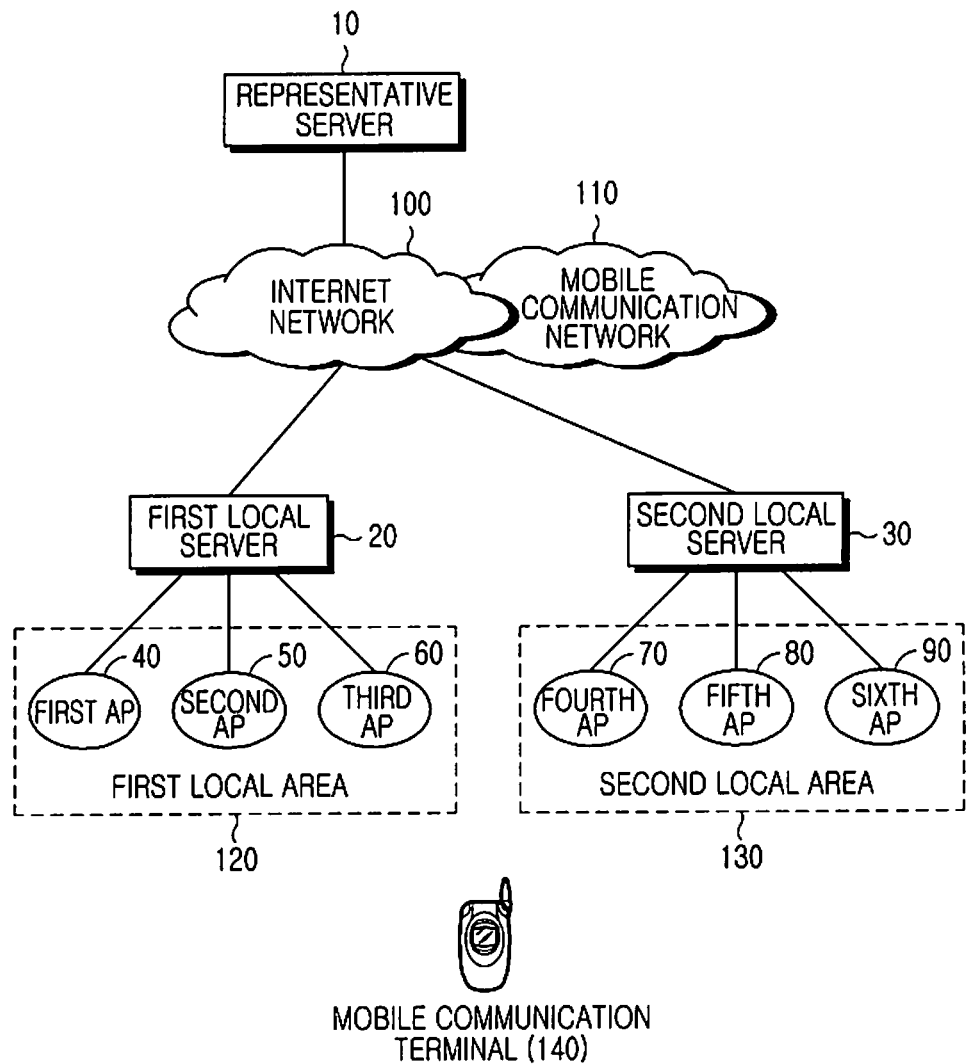
FIG. 1A illustrates a construction of a system according to the present invention.

Hereinafter, embodiments of the present invention will be described with reference to the accompanying drawings. In the following description, the same elements will be designated by the same reference numerals although they are shown in different drawings. In the following description, a detailed explanation of known related functions and constitutions may be omitted for the sake of clarity and conciseness.

The present invention is for selectively providing the WLAN service in a specific local area and providing an easy and convenient connection between a terminal and an AP. That is, if the terminal transmits a WLAN access request message for requesting the connection to the AP located in the specific local area to a server managing the WLAN service provided in the specific local area, the server receiving the WLAN access request message identifies whether the terminal can receives the WLAN service provided in the specific local area. The current standard of the authentication is that the terminal is located within the specific local area. As a result, the server transmits network setting information capable of accessing the AP located in the local area to the terminal and the terminal accesses the AP using the received network setting information.

FIG. 1A illustrates a construction of a system according to the present invention. Referring to FIG. 1A, the AP connection system includes local servers 20 and 30, APs 40, 50, 60, 70, 80, and 90, an Internet network 100, a mobile communication network 110, a mobile communication terminal 140, and a representative server 10.

The local servers 20 and 30 are for managing the WLAN service provided in at least one local area, and authenticating the terminal to selectively provide the WLAN service according to the mobile communication terminal and the authentication result, and allow or reject the connection of the terminal to the AP located in the local area. Then, the local servers 20 and 30 transmit the network setting information required for the connection of the mobile communication terminal permitted to connect to the AP and have a unique connection number for receiving a message through the mobile communication network. According to the present invention, the unique connection number is referred to as a service number. Further, the local servers 20 and 30 are connected with at least one AP, can communicate with the Internet network 100 and mobile communication network 110, and collect and manage a MAC address of the AP connected with the local servers 20 and 30 and the network setting information.

An administrator manages the MAC address of AP and the network setting information through the local servers 20 and 30. According to the present invention, the local servers 20 and 30 also collect the MAC information, which includes the MAC address, of a WLAN terminal located in the local area managed by the local servers 20 and 30, i.e. in a wireless signal transmission/reception range of the AP connected with the local servers 20 and 30. Then, the local servers 20 and 30 may provide web service related to the corresponding local area.

The network setting information is various information required for the connection between the mobile communication terminal and the AP and the WLAN communication and includes such information as a Service Set IDentifier (SSID), an Internet Protocol (IP) address, a subnet mask, a default gateway, a network key for the security communication, or WEP key.

Figure 1B:
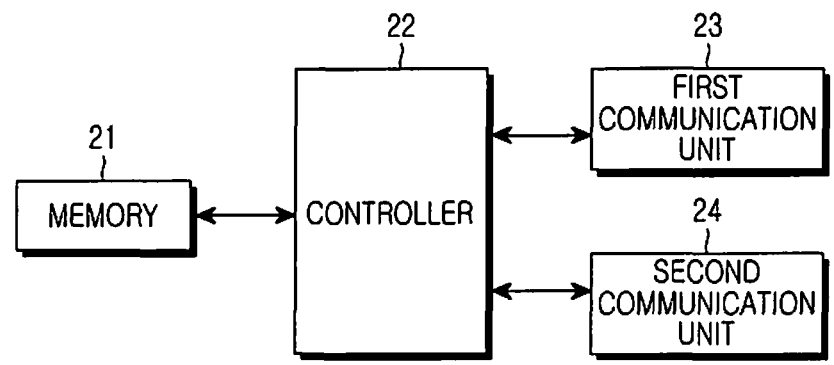
FIG. 1B illustrates a construction of a local server according to the present invention.

FIG. 1B illustrates a construction of a local server according to the present invention. Referring to FIG. 1B, the local servers 20 or 30 include a memory 21 for storing the MAC information of the collected AP or the mobile communication terminal and the network setting information for each AP, and a controller 22 for collecting the MAC information of the AP or the mobile communication terminal, authenticating the mobile communication terminal, and allowing/rejecting the AP connection according to the authentication result, each of which will be described in the following embodiment. The local servers 20 or 30 further include a first communication unit 23 for transmitting/receiving a message with the connected AP and a second communication unit 24 for transmitting/receiving a message through the mobile communication network. The controller 22 controls the memory 21, the first communication unit 23, and the second communication unit 24.

The APs 40, 50, 60, 70, 80, and 90 are for connecting the WLAN by wire, are connected to one local server, and are located in the local area subjected for the reception of the WLAN service. The APs 40, 50, 60, 70, 80, and 90 allocate the IP allowing the connection to the terminal desiring the WLAN connection located in the wireless signal transmission/reception range so that the terminal can receive the wireless Internet service through the AP.

At least one of APs 40, 50, 60, 70, 80, and 90 must be included in the local area in order for the local servers 20 and 30 to manage at least one local area. However, according to the present invention, it is preferred for purposes of efficiency that the local servers 20 and 30 each manage one local area, respectively.

Figure 1C:
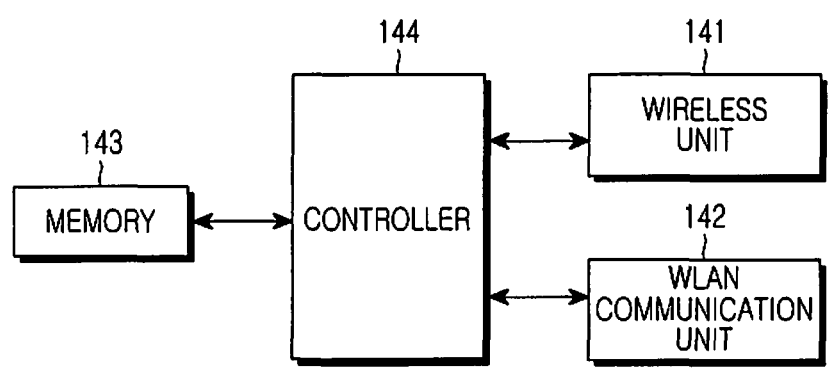
FIG. 1C illustrates a construction of a mobile communication terminal according to the present invention.

The mobile communication terminal is for mobile communication and includes a portable terminal having the WLAN function. FIG. 1C illustrates a construction of a mobile communication terminal according to the present invention. Referring to FIG. 1C, the mobile communication terminal 140 includes a wireless unit 141 for transmitting/receiving a signal and message for the mobile communication, a WLAN communication unit 142 for transmitting/receiving a signal and message for the WLAN communication, a memory unit 143 for storing such information as the MAC information of the mobile communication terminal 140, the MAC information of the AP received from an external apparatus and the network setting information, and a controller 144 for controlling the wireless unit 141, WLAN communication unit 142, and memory unit 143, and controlling the transmission/reception of the message for the AP connection and the operation of the mobile communication terminal 140, mobile communication terminal 140, which will be described later herein.

Further in FIG. 1A, the first local server 20 manages a first local area 120 and the second local server 30 manages the second local area 130. The first local area 120 includes a first AP 40, a second AP 50, and a third AP 60, each of which is connected to the first local server 20, respectively. The second local area 130 includes a fourth AP 70, a fifth AP 80, and a sixth AP 90, each of which is connected to the second local server 30, respectively. The local areas 120 and 130 may include, for example, a specific building, workplace, store, shop, and an exhibition place.

The steps for connecting the mobile communication terminal with the AP in the aforementioned system are as follows. If the mobile communication terminal is located in the specific local area and desires a connection with the AP in the corresponding local area, the mobile communication terminal transmits the WLAN access request message to the corresponding local server using the service number of the local server corresponding to the local area in which the mobile communication terminal is located through the mobile communication network. The WLAN access request message includes the MAC information of the mobile communication terminal 140 or the MAC information of the closest AP to the mobile communication terminal 140. The MAC information includes the MAC address of a corresponding apparatus. The used message may include a variety of means for transmitting data in the mobile communication network, such as Short Message Service (SMS), Multimedia Message Service (MMS), and a file.

The local server collects the MAC information of the AP connected with the local server or the MAC information of the mobile communication terminals located in the local area of the local server through the AP. The local server can discriminate which AP transmits the MAC information. If the local server collects the WLAN access request message, the local server determines whether the MAC information of the mobile communication terminal or the MAC information of the AP included in the WLAN access request message is included in the MAC information of the mobile communication terminal or the MAC information of the AP collected by the local server to authenticate the mobile communication terminal.

As a result of the identification, if the MAC information of the mobile communication terminal or of the AP included in the WLAN access request message is included in the MAC information of the mobile communication terminal or the MAC information of the AP collected by the local server, the local server allows the AP connection of the corresponding mobile communication terminal and transmits the network setting information required for the AP connection to the mobile communication terminal through the corresponding mobile communication network.

In this respect, the MAC information of the terminal to be connected is included in the information included in the transmission of the WLAN access request message, and the MAC information of the AP installed in the current local area is included in the WLAN access request message.

If a service provider of the WLAN service desires to establish a plurality of local areas located in different places, the system according to the present invention includes a representative local server for managing the local servers corresponding to each local area and collectively managing every local area for the connection between the mobile communication terminal and the AP. The representative server 10, as shown in FIG. 1A, is connected to the first local server 20 and the second local server 30 through the Internet network 100. As such, if the representative server 10 is additionally included, the representative server 10 authenticates a location of the mobile communication terminal that is performed in the first local server 20 and the second local server 30 and informs the corresponding local server of the result. Therefore, it is sufficient for the user to be aware of the service number only of the representative server 10, instead of the unique service number of each of the local servers 20 and 30. The operation of the representative server 10 and the specific operation of the local servers 20 and 30 varied according to the operation of the representative server 10 will be described below in detail.

As described above, the present invention identifies that the mobile communication terminal desiring to use the WLAN service is located in the corresponding local area and connects the mobile communication terminal with the AP so as to provide the selective WLAN service. Therefore, the network information capable of accessing the WLAN through the message of the mobile communication service is transmitted to the specific user to achieve a security advantage. Therefore, the present invention is useful in a personal workplace. That is, if the WLAN service is provided in a shop for the customer, the WLAN service is provided only to the authorized customer in the shop.

FIGS. 2 to 7 illustrate an embodiment of identifying the location of the mobile communication terminal using the MAC information of the mobile communication terminal according to the first embodiment and FIGS. 8 to 13 illustrate an embodiment of identifying the location of the mobile communication terminal using the MAC information of the AP according to the second embodiment of the present invention. FIGS. 3, 6, 9, and 12 illustrate the embodiment of the system including the local servers 20 and 30 only without the representative server 10, and FIGS. 4, 5, 7, 10, 11, 13 illustrate the embodiment of the system including the representative server 10.

Figure 2:
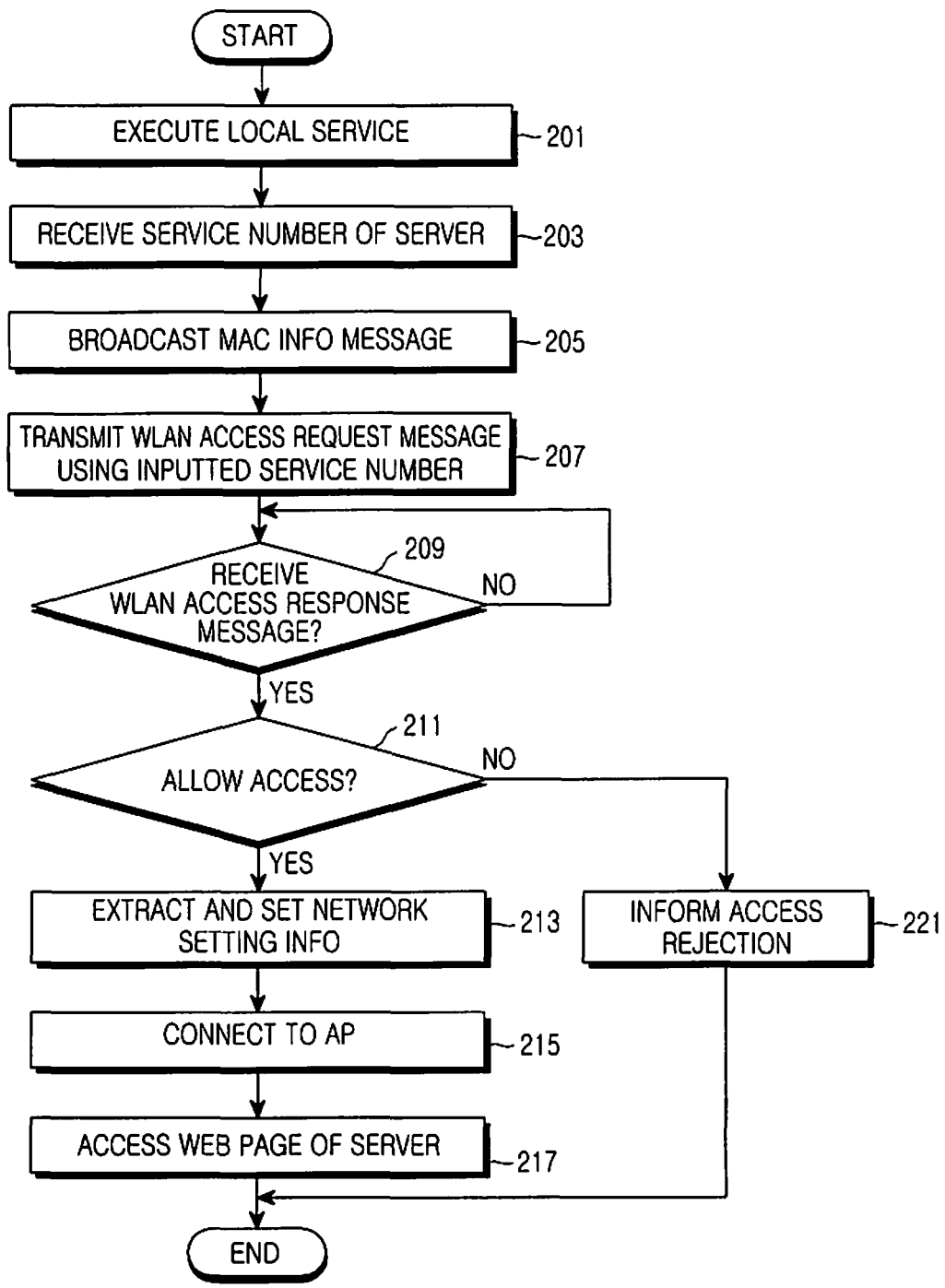
FIG. 2 illustrates the operation of a mobile communication terminal according to a first embodiment of the present invention.
Figure 3:
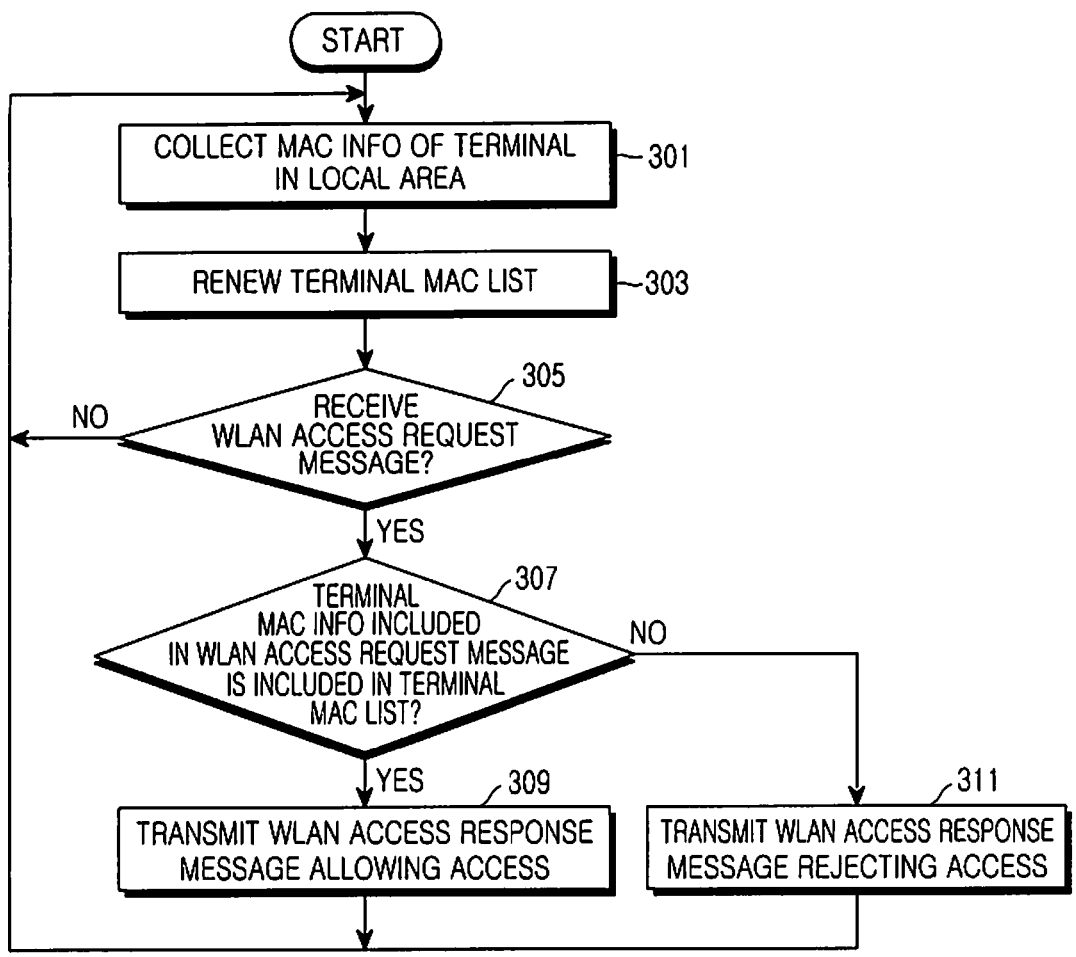
FIG. 3 illustrates the operation of a local server according to the first embodiment of the present invention.

FIG. 2 illustrates the operation of the mobile communication terminal when identifying the location of the mobile communication terminal using the MAC information of the mobile communication terminal, and the operation of the mobile communication terminal is similarly executed regardless of the inclusion of the representative server 10. FIG. 3 illustrates the operation of the local server.

Referring to FIG. 2, if the mobile communication terminal is located in the specific local area, or the user of the mobile communication terminal 140 is located in the first local area 120 and desires to use the WLAN service, the user executes the local service of the mobile communication terminal 140. Therefore, the mobile communication terminal 140 executes the local service in step 201.

Then, the user inputs the service number of the local server managing the local area in which the user is currently located, i.e. the first local server 20, in the mobile communication terminal 140. At this time, the service number of the first local server 20 can include a telephone number of a store in which the first local area is established.

Thereafter, the mobile communication terminal 140 broadcasts the MAC information message including the MAC information of the mobile communication terminal 140 in step 205 to collect the MAC information of the mobile communication terminals located in the first local area 130 by the APs 40, 50, and 60 installed in the first local area 130. The MAC information message, which can include a solicitation message, is continuously broadcasted until the mobile communication terminal 140 is connected to any AP or the execution of the local service is interrupted.

According to the broadcasting of the MAC information message by the mobile communication terminal 140, the AP closest to the mobile communication terminal 140, such as the first AP 40, receives the MAC information message and transfers the received MAC information message to the first local server 20. As such, the first local server 20 collects the MAC information of the first mobile communication terminal 140 in step 301 of FIG. 3 and recognizes that the first mobile communication terminal 140 is located in the service area of the first AP 40. Thereafter, the first local server 20 renews a terminal MAC list in step 303 and waits for the reception of a WLAN access request message in step 305. In the meantime, if the first local server 20 fails to receive any MAC information message for a period of time after initially receiving the MAC information message, the first local server 20 can delete the corresponding MAC information from the terminal MAC list.

Returning to FIG. 2, the mobile communication terminal 140 transmits the WLAN access request message including its MAC information and telephone number to the first local server 20 using the service number of the first local server 20 inputted in step 203 through the mobile communication network 110 in step 207 and waits for the reception of a WLAN access response message in step 209.

Therefore, the first local server 20 receives the WLAN access request message in step 305 and determines whether the terminal MAC information included in the WLAN access request message is included in the terminal MAC list in step 307. As a result, if the information identical to the terminal MAC information included in the WLAN access request message is included in the terminal MAC list, the first local server 20 transmits the WLAN access response message allowing access to the mobile communication terminal 140 through the mobile communication network 110 in step 309. The WLAN access response message includes network setting information to be set by the mobile communication terminal 140 for connecting the mobile communication terminal 140 to the AP.

Further, a WLAN access response message can include a URL address of a web page provided in the first local server 20. If the information identical to the terminal MAC information included in the WLAN access request message is not included in the terminal MAC list, the first local server 20 determines that the mobile communication terminal 140 is not located in the store and transmits the WLAN access response message rejecting access to the mobile communication terminal 140 through the mobile communication network 110 in step 311.

According to the transmission of the WLAN access response message by the first local server 20, the mobile communication terminal 140 receives the WLAN access response message in step 209 and determines whether the WLAN access response message allows access in step 211. If the WLAN access response message allows access, the mobile communication terminal 140 extracts and sets the network information in step 213 and is connected with the AP in step 215. If the WLAN access response message includes the URL address of a specific web page, the mobile communication terminal 140 accesses the corresponding web page in step 217. If the WLAN access response message rejects access, the mobile communication terminal 140 informs the user of the access failure and terminates the connection of the service in step 221.

Through the foregoing steps, the user can connect to the AP within the corresponding local area and automatically receive the unique service of the store only through transmitting the mobile communication message using the service number, such as the telephone number, without directly performing a complicated network setting.

The embodiment of identifying the location of the mobile communication terminal using the MAC information of the mobile communication terminal including the representative server 10 will be described with reference to FIGS. 4 and 5. The operation of the mobile communication terminal 140 is the same as the operation of FIG. 2, but it is noted that the service number inputted from the user in step 203 is the service number of the representative server 10 so that the WLAN access request message is transmitted to the representative server 10 in step 207. This is because the representative server 10 performs the step of authenticating the location of the mobile communication terminal 140 that is performed in the first local server 20 in FIG. 3. The corresponding operation steps of the first local server 20 are shown in FIG. 4 and those of the representative server 10 are shown in FIG. 5.

Figure 4:
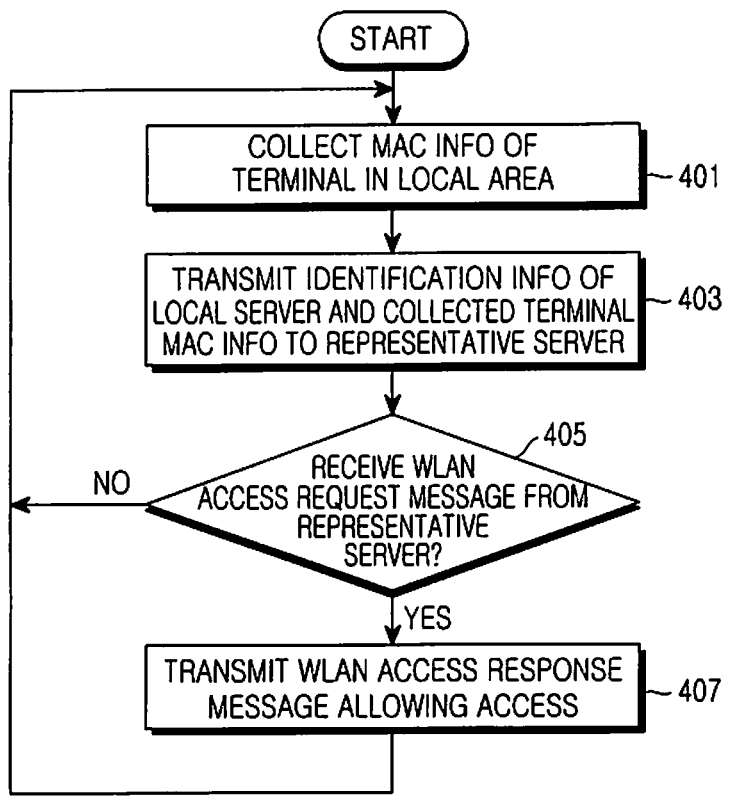
FIG. 4 illustrates the operation of a local server according to a derivative of the first embodiment of the present invention.

Referring to FIG. 4, the first local server 20 receives the MAC information message transmitted by the mobile communication terminals to collect the MAC information message of the mobile communication terminals located in the store through the APs 40, 50, and 60 of the first local area 120 in step 401. That is, the first local server 20 receives the MAC information message transmitted by the mobile communication terminal 140 through the AP 40, and transmits identification information of the local server and the collected MAC information of the terminal to the representative server 10.

Figure 5:
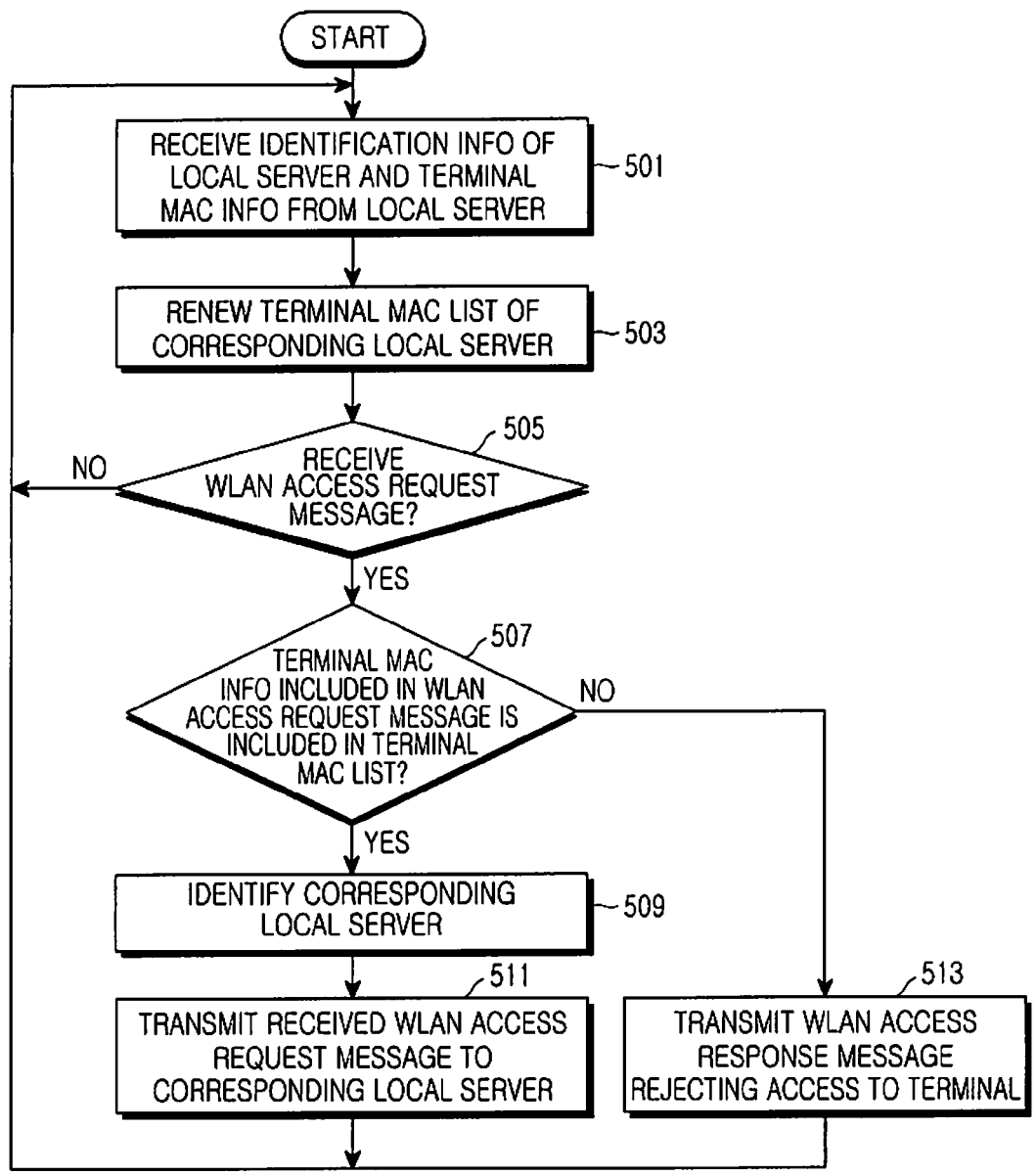
FIG. 5 illustrates the operation of a representative server according to the first embodiment of the present invention.

In this respect, the representative server 10 receives the identification information of the local server and the collected MAC information of the terminal from the first local server 20 in step 501 of FIG. 5 and renews the terminal MAC list corresponding to the corresponding local server in step 503. Then, the representative server 10 determines whether the WLAN access request message is received from the mobile communication terminal 140, and if the WLAN access request message is received from the mobile communication terminal 140, the representative server 10 determines whether the terminal MAC information included in the WLAN access request message is included in the terminal MAC list.

As a result, if the information identical to the terminal MAC information included in the WLAN access request message is not included in the terminal MAC list, the representative server 10 determines that the mobile communication terminal 140 is not located in the store and transmits the WLAN access response message rejecting access to the mobile communication terminal 140 through the mobile communication network 110 in step 513. If the information identical to the terminal MAC information included in the WLAN access request message is included in the terminal MAC list, the representative server 10 identifies the local server of the current mobile communication terminal 140 in step 509 and transmits the received WLAN access request message to the corresponding local server in step 511.

Therefore, the first local server 20 receives the WLAN access request message from the representative server 10 in step 405 and transmits the WLAN access response message allowing access to the mobile communication terminal 140 in step 511. The information included in the WLAN access response messages is identical to the above description and the corresponding operation of the mobile communication terminal 140 is similar to the above description.

Figure 6:
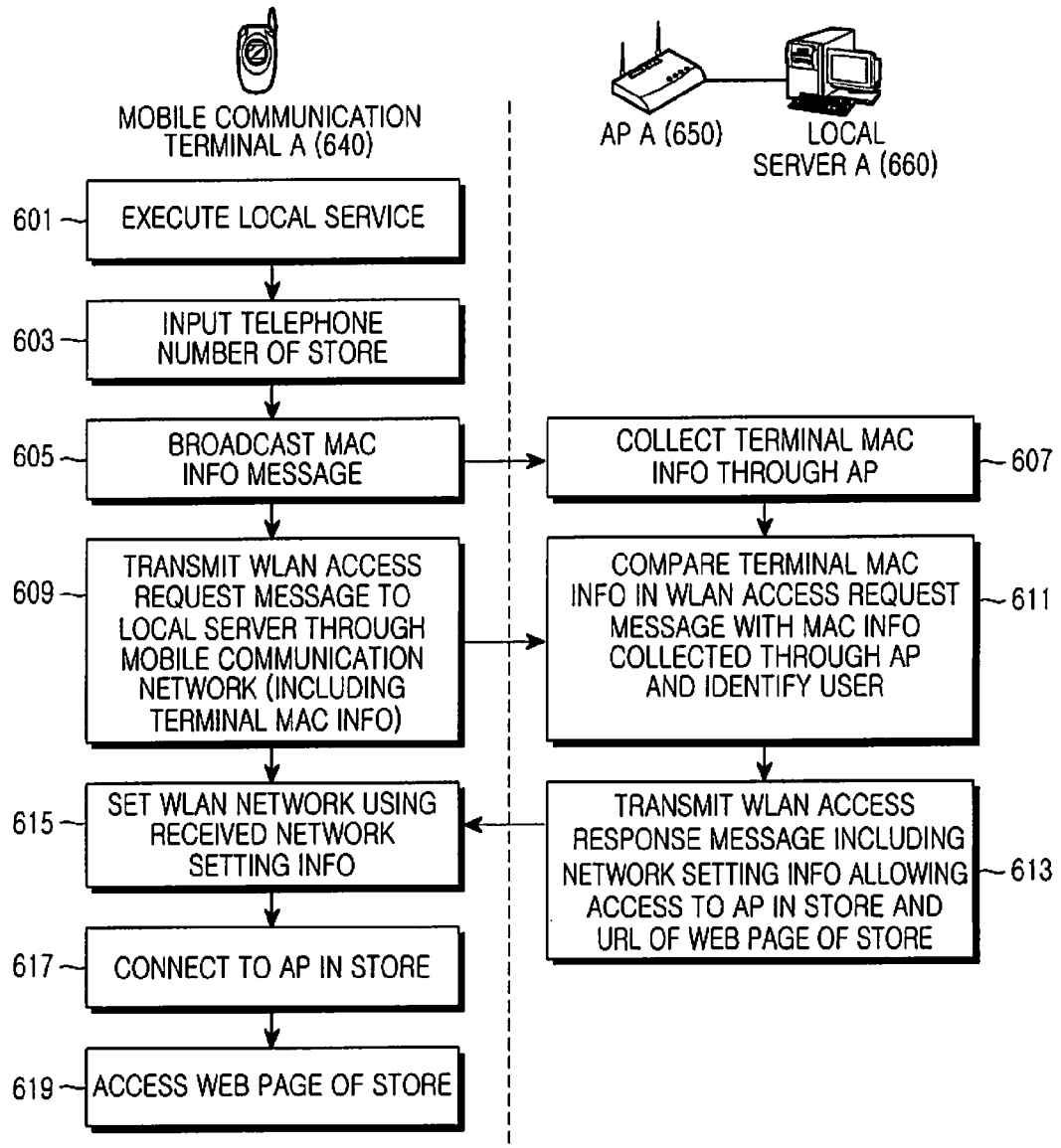
FIGS. 6 and 7 illustrate the operation of a system according to the first embodiment of the present invention.

FIG. 6 illustrates the operation of a mobile communication terminal A 640, an AP A 650, and a local server A 660 according to the embodiment of FIG. 3 in which the local area is a specific store in which is installed the AP A 650 and the local server A 660, and the mobile communication terminal A 640 is located in the store.

Referring to FIG. 6, the user activates the local service of the mobile communication terminal A 640 for receiving the WLAN service in the specific store in step 601. Then, the user inputs the telephone number of the store to the mobile communication terminal A 640 in step 603. The mobile communication terminal A 640 broadcasts the MAC information message in step 605 and the local server A 660 collects the MAC information of the mobile communication terminal A 640 through the AP A 650 in step 607.

The mobile communication terminal A 640 broadcasts the MAC information message and then transmits the WLAN access request message through the mobile communication network in step 609. The local server A 660 receiving the WLAN access request message compares the terminal MAC information included in the WLAN access request message with the MAC information collected through the AP A 650 to identify the user in step 611. The local server A 660 transmits the WLAN access response message including the network setting information allowing access to the AP within the store and the Uniform Resource Locator (URL) of the web page of the store in step 613.

The mobile communication terminal A 640 sets the WLAN network using the received network setting information in step 615, is connected to the AP within the store in step 617, and accesses the web page of the store in step 619.

Figure 7:
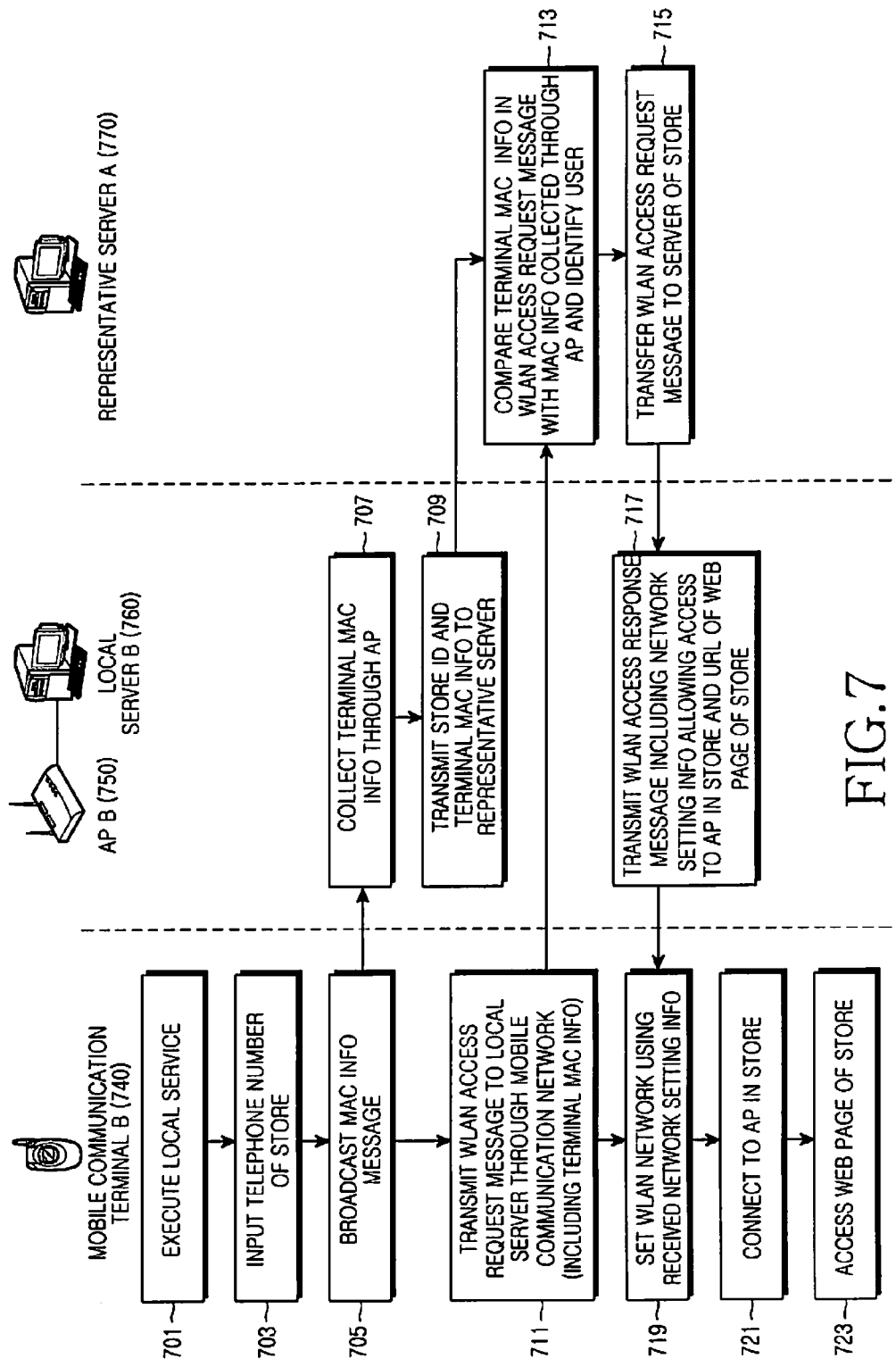

FIG. 7 illustrates the operation of a mobile communication terminal B 740, an AP B 750, a local server B 760, and a representative server A 770 according to the embodiments of FIGS. 4 and 5 in which the local area is a specific store in which the AP B 750 and the local server B 760 are installed, the mobile communication terminal B 740 is located in the store, and the representative server A 770 manages the local server B 760.

Referring to FIG. 7, the user activates the local service of the mobile communication terminal B 740 for receiving the WLAN service in the specific store in step 701. Then, the user inputs a representative telephone number related to the store to the mobile communication terminal B 740 in step 703. For example, if a coffee shop includes a plurality of branches, the representative telephone number may be of the corresponding coffee shop. The mobile communication terminal B 740 broadcasts the MAC information message in step 705 and the local server B 760 collects the MAC information of the mobile communication terminal B 740 through the AP B 750 in step 707.

The local server B 760 transmits a store ID and the MAC information of the mobile communication terminal B 740 to the representative server A 770 in step 709. The store ID is identification information of the local server B 760.

The mobile communication terminal B 740 broadcasts the MAC information message and then transmits the WLAN access request message through the mobile communication network in step 711. The representative server A 770 receiving the WLAN access request message compares the terminal MAC information included in the WLAN access request message with the MAC information received from the store, i.e. the local server B 760, to identify the user in step 713. The representative server A 770 transmits the WLAN access request message to the local server B 760 in step 715.

The local server B 760 transmits the WLAN access response message including the network setting information allowing access to the AP within the store and the URL of the web page of the store in step 717.

The mobile communication terminal B 740 sets the WLAN network using the received network setting information in step 719, is connected to the AP within the store in step 712, and accesses the web page of the store in step 723.

The method for identifying the location of the mobile communication terminal using the MAC information of the AP according to the second embodiment of the present invention will be described with reference to FIGS. 8 to 13. However, the embodiment of identifying the location of the mobile communication terminal using the MAC information of the AP within the local area in the system including the local servers 20 and 30, will be described with reference to FIGS. 8 and 9.

Figure 8:
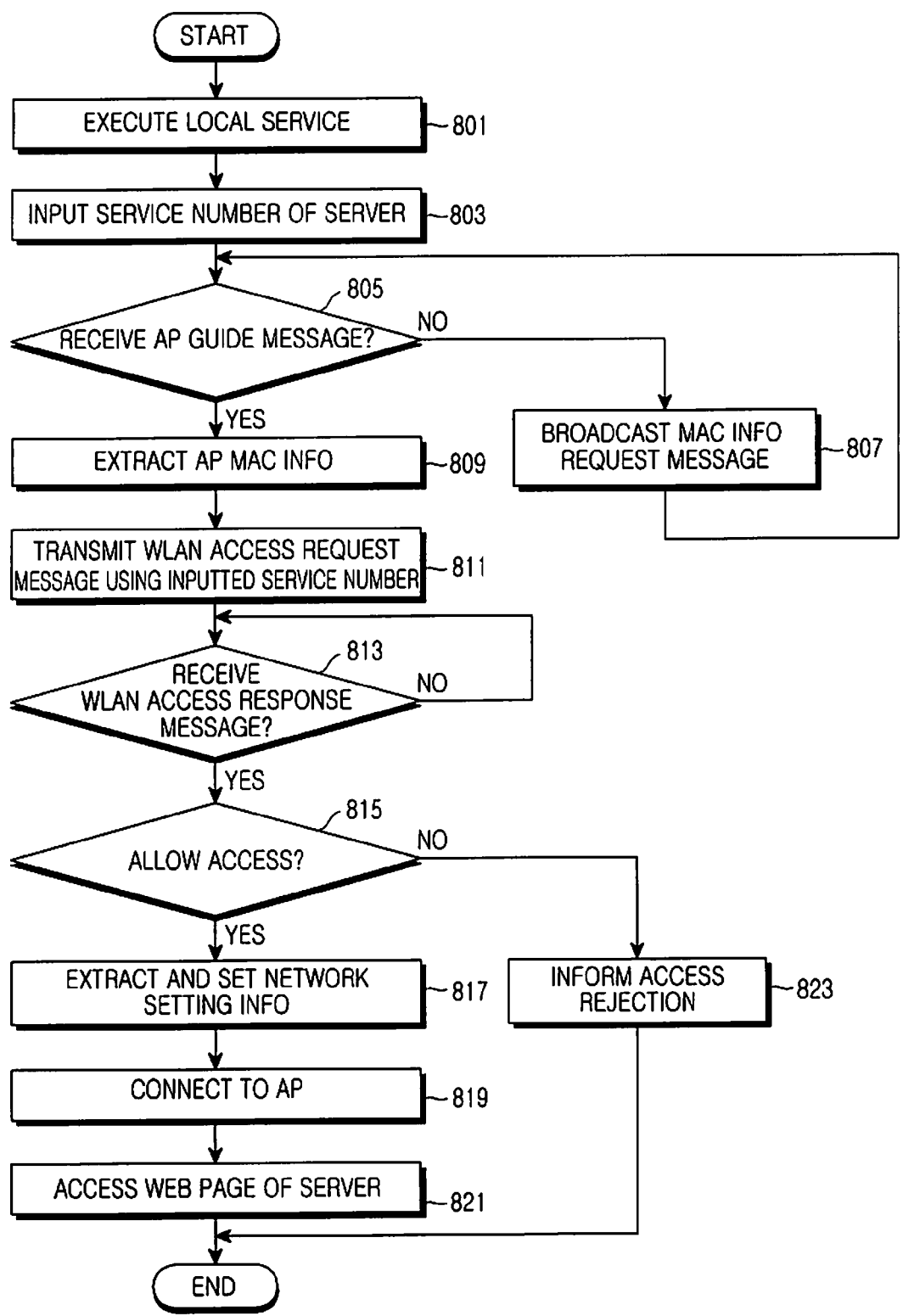
FIG. 8 illustrates the operation of a mobile communication terminal according to a second embodiment of the present invention.
Figure 9:
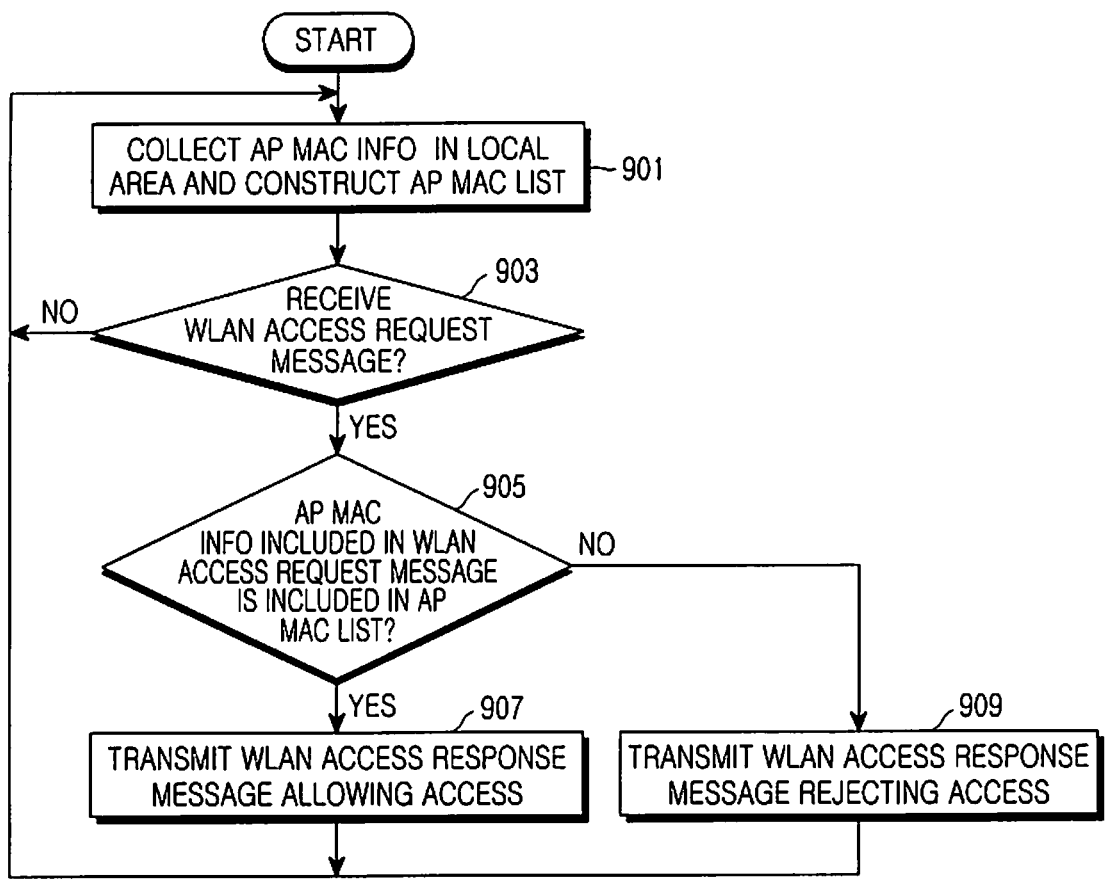
FIG. 9 illustrates the operation of a local server according to the second embodiment of the present invention.

FIG. 8 illustrates the operation of the mobile communication terminal according to the second embodiment of the present invention, when identifying the location of the mobile communication terminal using the MAC information of the AP and the operation of the mobile communication terminal is similarly executed regardless of the inclusion of the representative server 10. FIG. 9 illustrates the operation of the local server according to the second embodiment of the present invention.

Referring to FIG. 8, if the mobile communication terminal 140 is located in the specific local area such as the second local area 130, and desires to use the WLAN service, the user executes the local service of the mobile communication terminal 140. Therefore, the mobile communication terminal 140 executes the local service in step 801.

Then, the user inputs the service number of the local server managing the local area in which the user is currently located, i.e. the second local server 30, in the mobile communication terminal 140 in step 803. The service number of the second local server 30 can include a telephone number of a store in which the second local area 130 is established.

Then, the mobile communication terminal 140 determines whether an AP guide message including the MAC information of the AP is received in step 805. If the AP guide message including the MAC information of the AP is received, the mobile communication terminal 140 proceeds to step 809, and if the AP guide message including the MAC information of the AP is not received, the mobile communication terminal 140 proceeds to step 807. According to the second embodiment of the present invention, the location of the mobile communication terminal is identified using the MAC information of the AP so that each of the APs 40,50,60,70,80, and 90 periodically broadcasts the AP guide message including its MAC information. The AP guide message may use an advertisement message.

The mobile communication terminal 140 fails to receive the AP guide message so that it broadcasts a MAC information request message in step 807 and waits for the AP guide message in step 805. At this time, the MAC information request message may use a solicitation message.

The mobile communication terminal 140 extracts the MAC information of the AP from the received AP guide message in step 809, transmits the WLAN access request message including the MAC information of the AP and its telephone number using the service number of the second local server 30 inputted in step 803 to the second local server 30 through the mobile communication network 110, and waits for the reception of the WLAN access response message in step 811.

Referring to FIG. 9, the second local server 30 collects the MAC information of the APs 70, 80, and 90 installed in the second local area 130 and constructs an AP MAC list in step 901. Then, the mobile communication terminal 140 transmits the WLAN access request message in step 809 so that the second local server 30 receives the WLAN access request message in step 903 and determines whether the AP MAC information included in the WLAN access request message is included in the AP MAC list in step 905. If the information identical to the AP MAC information included in the WLAN access request message is included in the AP MAC list, the second local server 30 transmits the WLAN access response message allowing access to the mobile communication terminal 140 through the mobile communication network 110 in step 907. The WLAN access response message includes the network setting information to be set in the mobile communication terminal 140 for the connection of the mobile communication terminal 140 to the AP.

According to second the embodiment, the WLAN access response message can include a URL address of a web page provided in the second local server 30. If the information identical to the AP MAC information included in the WLAN access request message is not included in the AP MAC list, the second local server 30 determines that the mobile communication terminal 140 is not located in the store and transmits the WLAN access response message rejecting access to the mobile communication terminal 140 through the mobile communication network 110 in step 909.

According to the transmission of the WLAN access response message by the second local server 30, the mobile communication terminal 140 receives the WLAN access response message in step 813 and determines whether the WLAN access response message allows access in step 815. If the WLAN access response message allows access, the mobile communication terminal 140 extracts and sets the network information in step 817 and is connected with the AP in step 819. If the WLAN access response message includes the URL address of a specific web page, the mobile communication terminal 140 accesses the corresponding web page in step 821. If the WLAN access response message rejects access, the mobile communication terminal 140 informs the user of the access failure and terminates the connection of the service in step 823.

Through the foregoing steps, the user can connect to the AP within the corresponding local area and automatically receive the unique service of the store only through transmitting the mobile communication message using the service number, such as the telephone number, without directly performing a complicated network setting.

Next, the embodiment of identifying the location of the mobile communication terminal using the MAC information of the AP if the representative server 10 is included will be described with reference to FIGS. 10 and 11. The operation of the mobile communication terminal 140 is the same as the operation of FIG. 8. However, the service number inputted from the user in step 803 is the service number of the representative server 10 so that the WLAN access request message is transmitted to the representative server 10 in step 811. This is because the representative server 10 performs the step of authenticating the location of the mobile communication terminal 140 that is performed in the second local server 30 in FIG. 9. The corresponding operation of the second local server 30 is shown in FIG. 10 and the operation of the representative server 10 is shown in FIG. 11.

Figure 10:
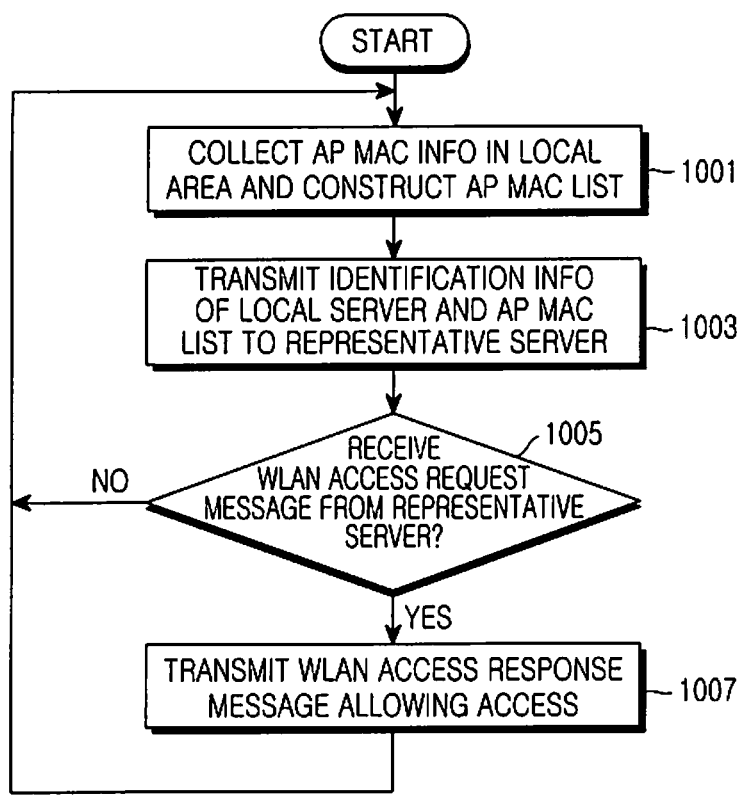
FIG. 10 illustrates the operation of a local server according to a derivative of the second embodiment of the present invention.

Referring to FIG. 10, the second local server 30 collects the MAC information of the AP of the local area, i.e. the APs 70, 80, and 90 of the second local area 130, and constructs the AP MAC list in step 1001. Then, the second local server 30 transmits identification information of the local server and the AP MAC list to the representative server 10 in step 1003.

Figure 11:
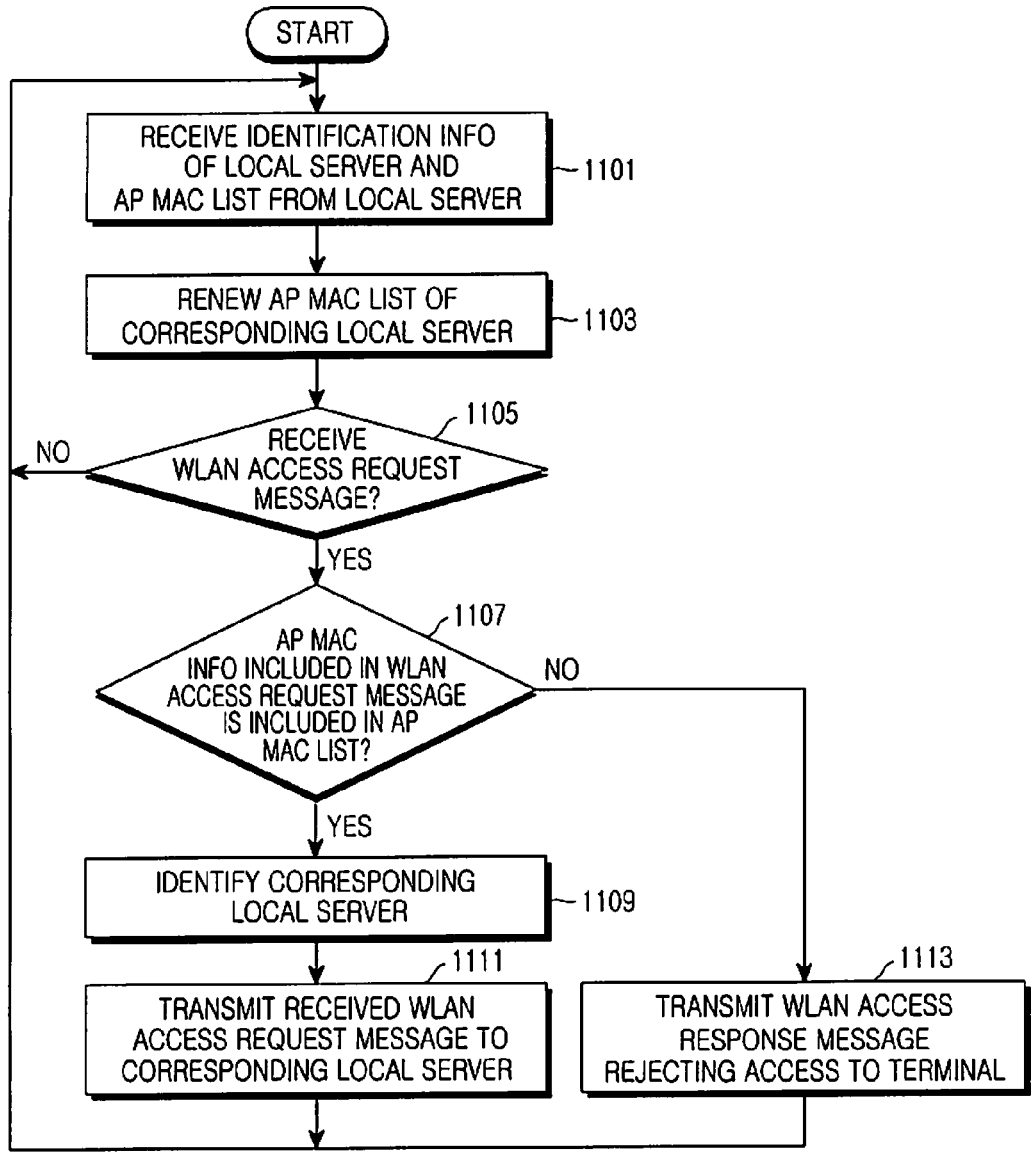
FIG. 11 illustrates the operation of a representative server according to the second embodiment of the present invention.

In this respect, the representative server 10 receives the identification information of the local server and the AP MAC list from the second local server 30 in step 1101 of FIG. 11 and renews the AP MAC list corresponding to the corresponding local server in step 1103. Then, the representative server 10 determines whether the WLAN access request message is received from the mobile communication terminal 140. If the WLAN access request message is received from the mobile communication terminal 140, the representative server 10 determines whether the AP MAC information included in the WLAN access request message is included in the AP MAC list.

As a result, if the information identical to the AP MAC information included in the WLAN access request message is not included in the AP MAC list, the representative server 10 determines that the mobile communication terminal 140 is not located in the store and transmits the WLAN access response message rejecting access to the mobile communication terminal 140 through the mobile communication network 110 in step 1113. If the information identical to the AP MAC information included in the WLAN access request message is included in the AP MAC list, the representative server 10 identifies the local server of the current mobile communication terminal 140 and transmits the received WLAN access request message to the corresponding local server in step 1111.

Therefore, the second local server 30 receives the WLAN access request message from the representative server 10 in step 1005 and transmits the WLAN access response message allowing access to the mobile communication terminal 140 in step 1011. The information included in the WLAN access response messages is identical to the above description and the corresponding operation of the mobile communication terminal 140 is the same as the above description.

Figure 12:
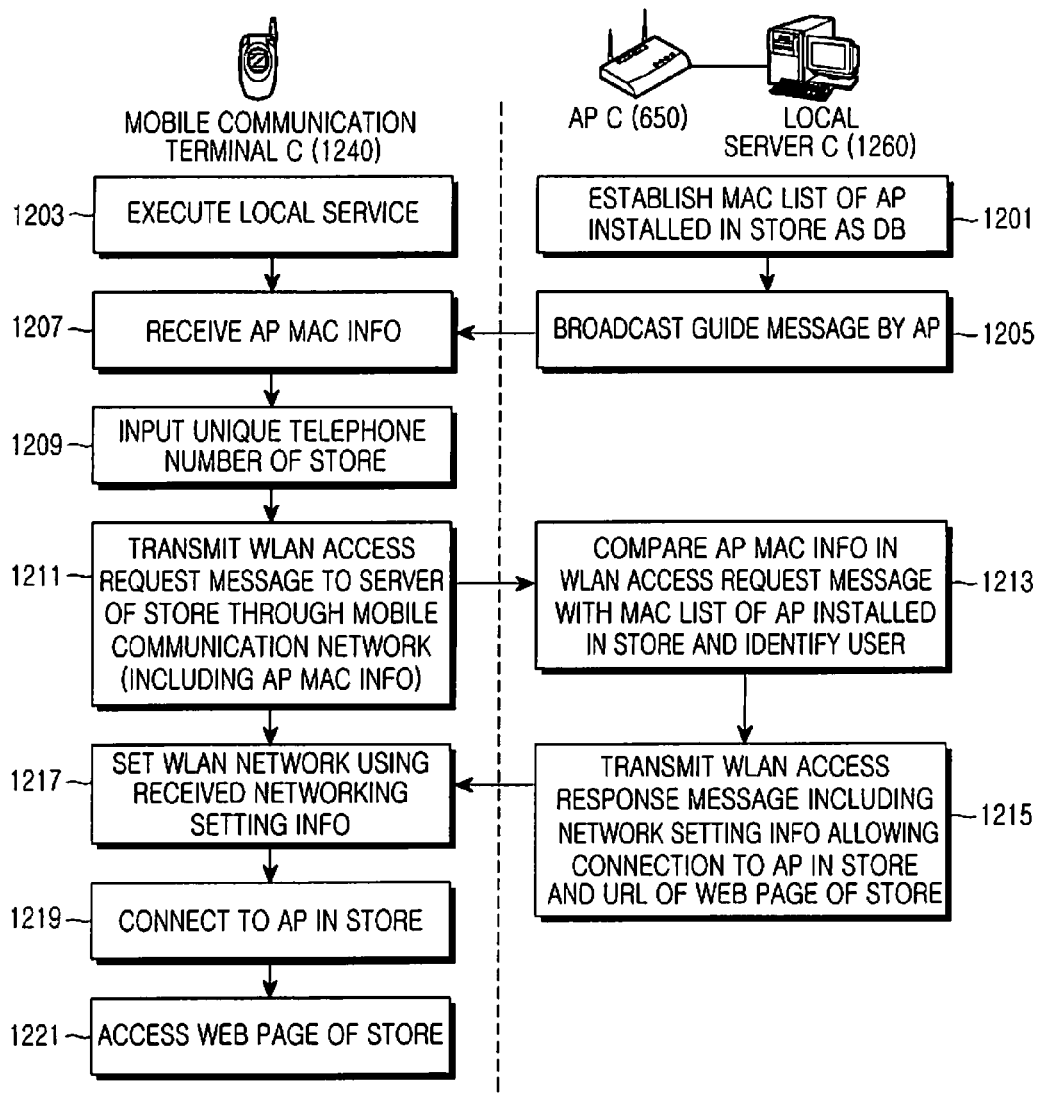
FIGS. 12 and 13 illustrate the operation of a system according to the second embodiment of the present invention.

FIG. 12 illustrates the operation of a mobile communication terminal C 1240, an AP C 1250, and a local server C 1260 according to the second embodiment of the present invention of FIG. 9 in which the local area is a specific store in which is installed the AP C 1250 and the local server C 1260, and the mobile communication terminal C 1240 is located in the store.

Referring to FIG. 12, the local server C 1260 collects the MAC information of the APs including the AP installed in the store, i.e. the AP C 1250, and constructs the AP MAC list as the DataBase (DB) in step 1201.

The user activates the local service of the mobile communication terminal C 1240 for receiving the WLAN service in the specific store in step 1203.

The AP C 1250 broadcasts the AP guide message including its MAC information in step 1205 and the mobile communication terminal C 1240 receives the AP MAC information in step 1207. The user inputs the telephone number of the store in the mobile communication terminal C 1240 in step 1209 and the mobile communication terminal C 1240 transmits the WLAN access request message through the mobile communication network in step 1211.

The local server C 1260 receiving the WLAN access request message compares the AP MAC information included in the WLAN access request message with the AP MAC list for the AP installed in the store and identifies the user in step 1213. The local server C 1260 transmits the WLAN access response message including the network setting information allowing access to the AP within the store and the URL of the web page of the store in step 1215.

The mobile communication terminal C 1240 sets the WLAN network using the received network setting information in step 1217, is connected to the AP within the store in step 1219, and accesses the web page of the store in step 1221.

Figure 13:
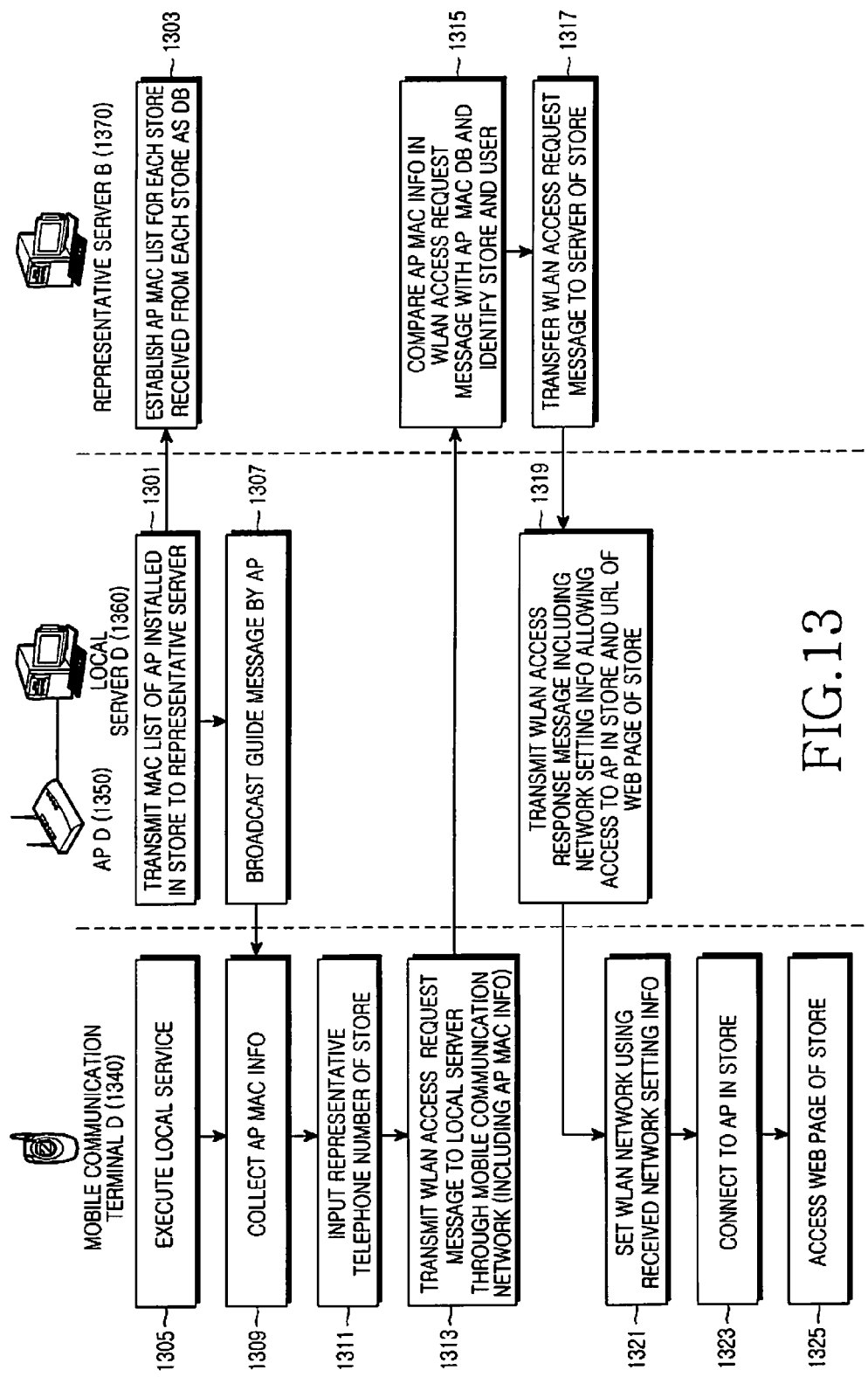

FIG. 13 illustrates the operation of a mobile communication terminal D 1340, an AP D 1350, a local server D 1360, and a representative server B 1370 according to the second embodiment of the present invention of FIGS. 10 and 11 in which the local area is a specific store in which is installed the AP D 1350 and the local server D 1360, the mobile communication terminal D 1340 is located in the store, and the representative server B 1370 manages the local server D 1360.

Referring to FIG. 13, the local server D 1360 collects the MAC information of the APs, i.e. the AP D 1350, installed in the store and transmits the collected MAC information of the APs to the representative server B 1370 in step 1301. The representative server B 1370 constructs the AP MAC list for each store received from each store as the database in step 1303.

The user activates the local service of the mobile communication terminal D 1340 for receiving the WLAN service in the specific store in step 1305.

The AP D 1350 broadcasts the AP guide message including its MAC information in step 1307 and the mobile communication terminal D 1340 receives the AP MAC information in step 1309. Then, the user inputs a representative telephone number related to the store to the mobile communication terminal D 1340 in step 1311. For example, if an electronic product shop includes a plurality of branches, the representative telephone number may be a representative telephone number of the corresponding electronic product shop. The mobile communication terminal D 1340 transmits the WLAN access request message through the mobile communication network in step 1313.

The representative server B 1370 receiving the WLAN access request message compares the AP MAC information included in the WLAN access request message with the AP MAC database and identifies the user in step 1315. The representative server B 1370 transmits the WLAN access request message to the local server D 1360 in step 1317.

The local server D 1360 transmits the WLAN access response message including the network setting information allowing access to the AP within the store and the URL of the web page of the store in step 1319.

The mobile communication terminal D 1340 sets the WLAN network using the received network setting information in step 1321, is connected to the AP within the store in step 1323, and accesses the web page of the store in step 1325.

According to the present invention, if the unique service including the product information provision, ordering, payment, and event information provision, is provided in the existing store through the WLAN, the user can enjoy the service without inconveniently setting the network or using the specific terminal. Therefore, the user can conveniently use the service of the store and the owner of the store is not required to provide the special network terminal, which saves the expense for purchasing and managing the terminal.

The present invention can selectively provide the WLAN service in the local area according to the user, which increases the convenience in connecting the terminal with the AP. Further, according to the present invention, when the WLAN service is provided in the specific workplace, the terminal can be automatically connected with the AP of the workplace using the telephone number of the workplace and automatically accesses the web page of the workplace after connecting with the AP of the workplace so that the user can easily use various services, such as the workplace information and product information, and services for ordering and payment provided from the workplace.

While the present invention has been shown and described with reference to certain exemplary embodiments and drawings thereof, it will be understood by those skilled in the art that various changes in form and description may be made therein without departing from the spirit and scope of the invention.

What is claimed is:

1. A method for connecting a mobile communication terminal with an access point located in a local area providing a Wireless Local Area Network (WLAN) service, the method comprising the steps of:
   broadcasting, by the mobile communication terminal, a Media Access Control (MAC) information message including MAC information of the mobile communication terminal for authenticating the mobile communication terminal to a server through the access point;
   transmitting, by the mobile communication terminal, a WLAN access request message including the MAC information of the mobile communication terminal to the server through a mobile communication network;
   receiving, by the mobile communication terminal, a WLAN access response message including an authentication result obtained by the server using the MAC information included in each of the MAC information message and the WLAN access request message from the server; and
   extracting, by the mobile communication terminal, network setting information for connection to the access point from the WLAN access response message if the WLAN access response message is a message allowing the connection to the access point and connecting to the access point using the extracted network setting information.

2. The method as claimed in claim 1, wherein the mobile communication terminal transmits the WLAN access request message to the server using a service number corresponding to the server inputted from a user through the mobile communication network.

3. The method as claimed in claim 1, further comprising informing rejection of the connection to the access point if the WLAN access response message is a message rejecting the connection to the access point.

4. The method as claimed in claim 1, further comprising connecting to the access point and then accessing a web page if the WLAN access response message includes an address of a web page provided from the server.

5. A mobile communication terminal for connecting with an access point located in a local area providing a Wireless Local Area Network (WLAN) service, the mobile communication terminal comprising:
   a wireless unit;
   a WLAN communication unit; and
   a controller for broadcasting a Media Access Control (MAC) information message including MAC information of the mobile communication terminal for authenticating the mobile communication terminal to a server through the access point, transmitting a WLAN access request message including the MAC information of the mobile communication terminal to the server through a mobile communication network, receiving a WLAN access response message including an authentication result obtained by the server using the MAC information included in each of the MAC information message and the WLAN access request message from the server, extracting network setting information for connection to the access point from the WLAN access response message if the WLAN access response message allows the access point connection from the server, and connecting to the access point using the extracted network setting information.

6. The mobile communication terminal as claimed in claim 5, wherein the mobile communication terminal connects to the access point and then accesses the web page if the received WLAN access response message includes an address of a web page provided from the server.

7. A method for connecting a mobile communication terminal with an access point located in a local area providing a Wireless Local Area Network (WLAN) service, the method comprising the steps of:
   by the mobile communication terminal,
   receiving a guide message including Media Access Control (MAC) information of the access point from the access point;
   transmitting a WLAN access request message including the MAC information of the access point for authenticating the mobile communication terminal to a server through a mobile communication network, the server being connected with the access point and storing MAC information of the access point;
   receiving a WLAN access response message including an authentication result obtained by the server using the MAC information of the access point included in the WLAN access request message from the server; and
   if the WLAN access response message allows connection to the access point, extracting network setting information for the connection to the access point from the WLAN access response message and connecting to the access point using the extracted network setting information.

8. The method as claimed in claim 7, wherein the mobile communication terminal transmits the WLAN access request message to the server using a service number corresponding to the server inputted from a user through the mobile communication network.

9. The method as claimed in claim 7, further comprising informing rejection of the connection to the access point if the WLAN access response message rejects the connection to the access point.

10. The method as claimed in claim 7, further comprising connecting to the access point and then accessing a web page if the WLAN access response message includes an address of a web page provided from the server.

* * * * *